United States Patent
Hoadley et al.

(10) Patent No.: US 9,408,067 B1
(45) Date of Patent: Aug. 2, 2016

(54) SELECTIVELY DISALLOWING USE OF MEDIA OVER DATA CALLING IN A SEGMENT BASED ON SEGMENT CHARACTERISTICS

(71) Applicant: Taqua WBH, LLC, Richardson, TX (US)

(72) Inventors: John Hoadley, McKinney, TX (US); Payam Maveddat, Plano, TX (US)

(73) Assignee: Taqua, LLC, Richardson, TX (US)

( * ) Notice: Subject to any disclaimer, the term of this patent is extended or adjusted under 35 U.S.C. 154(b) by 137 days.

(21) Appl. No.: 14/094,518

(22) Filed: Dec. 2, 2013

(51) Int. Cl.
*H04W 8/22* (2009.01)
*H04W 76/02* (2009.01)

(52) U.S. Cl.
CPC .............. *H04W 8/22* (2013.01); *H04W 76/02* (2013.01)

(58) Field of Classification Search
None
See application file for complete search history.

(56) References Cited

U.S. PATENT DOCUMENTS

| | | | | |
|---|---|---|---|---|
| 7,324,505 | B2 * | 1/2008 | Hoover | 370/352 |
| 7,706,264 | B2 * | 4/2010 | Lai et al. | 370/230 |
| 8,320,272 | B2 * | 11/2012 | Kahn | H04L 12/5692 370/252 |
| 8,626,151 | B2 * | 1/2014 | Beppler et al. | 455/425 |
| 8,879,544 | B1 * | 11/2014 | Rathnam et al. | 370/352 |
| 8,885,599 | B2 * | 11/2014 | Rexhepi et al. | 370/331 |
| 8,897,265 | B2 * | 11/2014 | Kashimba et al. | 370/331 |
| 8,908,642 | B2 * | 12/2014 | Nishida et al. | 370/331 |
| 8,989,813 | B2 * | 3/2015 | LaBauve et al. | 455/555 |
| 9,019,870 | B2 * | 4/2015 | Khan et al. | 370/271 |
| 9,025,525 | B2 * | 5/2015 | Aksu et al. | 370/328 |
| 9,107,049 | B2 * | 8/2015 | Lindsay | H04W 4/12 |
| 9,137,205 | B2 * | 9/2015 | Rogers | H04L 63/0218 |
| 2009/0270064 | A1 * | 10/2009 | Kunniyur et al. | 455/404.1 |

* cited by examiner

*Primary Examiner* — Min Jung
(74) *Attorney, Agent, or Firm* — Norton Rose Fulbright US LLP

(57) ABSTRACT

Systems and methods for selectively disallowing use of Media over Data in a network segment within a cellular network or a mobile communication network, at call initiation, in order to ensure a consummate user experience, are disclosed. An embodiment of the invention identifies a segment associated with a Media over Data call, at initiation, and utilizes a policy database to obtain a segment designation specific to the segment previously identified. Based on the segment designation, the Media over Data call is then either allowed or disallowed. The segment designation is based on segment conditions and/or subscriber policy characteristics.

48 Claims, 3 Drawing Sheets

SELECTIVELY DISALLOWING USE OF MEDIA OVER DATA CALLING IN A SEGMENT BASED ON SEGMENT CHARACTERISTICS

TECHNICAL FIELD

The present application relates generally to providing high quality Media (Rich Media, Multimedia, Voice, Video, file sharing, etc.) over Data services, and, more particularly, to selectively disallowing use Media over Data in a segment of a network, at initiation, based on one or more segment characteristics.

BACKGROUND

In a modern mobile network, voice traffic is handled by Circuit-Switched (CS) networks while data traffic is handled by Packet-Switched (PS) networks (e.g., data links provided by second generation (2G) data, third generation (3G) data, high speed packet access (HSPA), 1×, Long Term Evolution (LTE), LTE-Advanced (LTE-A), etc.). However, and despite the fact that PS networks were originally designed as data networks, their quality of service (QoS) and capacity gains provide subscribers and operators significant additional benefits for voice services, such as High Definition (HD) voice, enhanced video capabilities, and rich communication offerings. Central to the enablement of today's smartphones is meeting the high expectation for mobile user communication experience by augmenting voice calls and video calls with these richer media services. To that end, Media services, such as Rich Media Services, Multimedia, Voice, Video, file sharing, etc., have been introduced.

An example of Media over Data services, VoLTE is a voice telephony solution comprising the IP Multimedia Subsystem (IMS) and the multimedia telephony (MMTel) service that delivers voice services over LTE access. Although VoIP using Internet-based PS 2G/3G applications (e.g. mobile Skype) have been available since early 2010, the data streams in these "over the top" (OTT) voice applications are not differentiated from other IP data traffic, so network and user device IP traffic loads can severely compromise voice quality of service. VoLTE, in contrast, operates as a native application in the user's mobile device, enabling prioritization over other data streams to deliver a high QoS. Based on IMS/MMTel, voice services can be further enriched with video and combined with several other enhanced IP-based services such as HD voice, presence, location and Rich Communication Suite (RCS) additions like instant messaging, video share and enhanced/shared phonebooks. The introduction of VoLTE, though evolving as the mobile industry infrastructure evolves toward higher LTE availability, presents unique challenges.

One of those challenges is ensuring voice call continuity (VCC) as mobile devices move from an area with LTE coverage to a non-LTE coverage area, by handing over a voice call from the LTE PS network to a CS network, and simultaneously transition the audio stream from VoLTE packet-switched delivery to CS delivery, while the call is in progress. This is especially important since in many cases, service providers build and expand their LTE networks gradually. As a result, LTE networks and the VoLTE services built on top of them must be able to coexist with CS networks and to ensure handover to the CS network when LTE coverage is insufficient. Each VCC handover, however, increases the risk of a dropped call. This is because each VCC handover must retune the mobile device to a new frequency, must acquire and begin transmitting on the legacy network, and must transition from delivering audio packets via a packet-switched solution to a circuit-switched delivery, all in near simultaneous fashion while minimizing any disruption to the real-time voice call that is in progress. Therefore, it is desired to minimize the number of VCC handovers.

Another challenge presented by an implementation of VoLTE, although not actually inherent to the VoLTE technology, relates to the Radio Frequency (RF) uplink budget performance of VoLTE in relation to the performance of voice in legacy technologies, such as 2G or 3G networks. It has been found that VoLTE deployments can result in a shortfall on the LTE link budget that can reach 12 dB. The link budget shortfall is especially challenging when VoLTE is implemented at higher bands, since the link budget used for the Radio Frequency (RF) network design often has less margin in bands greater than 1.5 GHz, for example. Although the link budget shortfall was anticipated, actual VoLTE implementations have revealed it to be greater than expected.

The link budget shortfall has a significant impact on VoLTE performance. For example, the link budget shortfall results in a high Packet Error Rate (PER), which results in poor voice quality. Furthermore, the link budget shortfall also results in a greater number of VCC handovers, since the system recognizes that VoLTE coverage is marginal and so it switches to a fallback circuit switched protocol via VCC, which increases the risk of a dropped call.

Several solutions have been proposed to address the link budget shortfall. One solution would restrict the deployment of VoLTE to bands less than 1 GHz. However, this presents a problem because RF spectrum is limited and thus often not available in this range. Another solution that has been proposed is simply optimizing LTE for voice by use of enabling technologies such as Transmission Time Interval (TTI) bundling, antenna tilting, or terminal transmission power settings. However, some of these key VoLTE enablers are not yet available, and the impact of their implementation will not always be enough to overcome the VoLTE uplink budget issues.

Given that it appears that the majority of service providers will evolve their networks to LTE or other forms of advanced data networks, there is a need in the art for a solution to ensure a consummate user experience, while taking into considerations the challenges presented by the technology implementing Media services, such as Rich Media Services, Multimedia, Voice, Video, file sharing, etc.

BRIEF SUMMARY

The present invention is directed to systems and methods for selectively disallowing use of Media over data, such as Rich Media Services, Multimedia, Voice over Data (e.g., VoLTE, etc.), Video over Data (e.g., real time video calling, conversational video), File Sharing over Data, etc., in a network segment (e.g. a cell, a sector, a cluster of cells, or a cluster of sectors, etc., within a cellular network or a mobile communication network) at call initiation, in order to ensure a consummate user experience. Media over Data as used herein refers to the implementation of Rich Media, Multimedia, Voice, Video, file sharing, or other media communication carried over advanced data networks, such as those provided by LTE networks, wherein a mobile device application providing communication of media packets over PS data links operates as a native communication application in the mobile device, enabling prioritization over other data streams to deliver a high QoS using a plurality of different communication protocols (e.g., different PS protocols, PS and CS protocols, and combinations thereof). It will be appreciated that Media over Data services may include any one of a number of services such as voice calls, video calls, instant messaging, video share, image share, SMS and MMS RCS, voice mixing, video mail, video ring-back tones and video conferencing with live video share, among others.

Media over Data segment disallowing techniques of embodiments herein relate to situations where a segment's characteristics, the characteristics of a subscriber mobile device within a segment, and/or the characteristics of a nearby segment (e.g., a segment adjacent to a segment in which a call originates or terminates), increase the likelihood that a Media over Data call originating from the subscriber mobile device within the segment, or terminating at the subscriber mobile device within the segment, will be dropped or suffer from low quality. Such unfavorable conditions may be conditions that have a significant effect on Media over Data services but may have little or no effect on Media over Data-call fallback protocols (e.g., 3G, VoHSPA, WiFi or other legacy telephony domains or circuit switched domains). In such a case, disallowing the use of Media over Data, at call initiation, will force the originating and/or the terminating subscriber mobile device to switch to a fallback protocol for voice calls, thereby avoiding the risks posed by the unfavorable conditions of the segment.

It should be appreciated that call termination, as used herein, means the termination point, that is, the destination of a Media over Data call. Further, as used herein, call initiation refers to the initial event of requesting a Media over Data call, and call origination refers to the location from where the call is initiated. Thus, in embodiments of the invention, use of Media over Data may be selectively disallowed based on characteristics of the segment in which the call originates, characteristics of the segment in which the call terminates, and/or characteristics of one or more segments nearby to the segment in which the call originates. Moreover, use of Media over Data may be selectively disallowed according to embodiments herein based on characteristics of the subscriber profile of one or more party associated with a Media over Data call.

In some embodiments, a policy database may contain information relating to whether VoLTE is allowed or disallowed to/from a specific segment. The policy database may be manually generated and/or updated, or may be generated and/or updated based on rules and data stored in a segment data database. The rules and data stored in the segment database may include rules and data to monitor segment characteristics (e.g., network performance, packet-error rates, sufficiency of bandwidth to handle Media over Data, signal quality, signal strength, Channel Quality Indicator (CQI), Aggregate or Cell Edge Throughput, Average and Cell Edge Reference Signal Received Power (RSRP), Reference Signal Received Quality (RSRQ), average and/or peak latency, VCC handover count, or location of the segment within the area of coverage) and the segment characteristics may further include subscriber profile characteristics (e.g., a location of a mobile device associated with a subscriber profile, an identity of a subscriber associated with the subscriber policy, last origination attempt, or the type of Media over Data call). The segment designation in the policy database may be used to selectively allow or disallow a Media over Data call, at call initiation, originating from, or terminating at, a mobile device within the segment.

In a representative embodiment, a segment associated with a Media over Data call may be identified, at call initiation. For example, the originating segment of a Media over Data call may be identified via a cell ID and/or sector ID included in a header of the call origination request. Additionally, the terminating segment of a Media over Data call may be identified by, for example, obtaining the originating segment from where the terminating subscriber attempted the last call. Alternatively, the terminating segment of a Media over Data call may be identified from a database in the network containing the terminating subscriber's location (e.g., Home Subscriber Server [HSS] or Home Location Register [HLR]). A segment designation, specific to the identified segment, and disallowing or allowing Media over Data in the segment may then be obtained from a policy database. Then, based on the segment designation, the Media over Data call may be either allowed or disallowed, thereby forcing the call to be made on the legacy CS network.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWING

For a more complete understanding, reference is now made to the following descriptions taken in conjunction with the accompanying drawings, in which.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation. Likewise, the terminology used herein is for the purpose of describing particular embodiments only, and is not intended to limit the invention.

Figure 1:
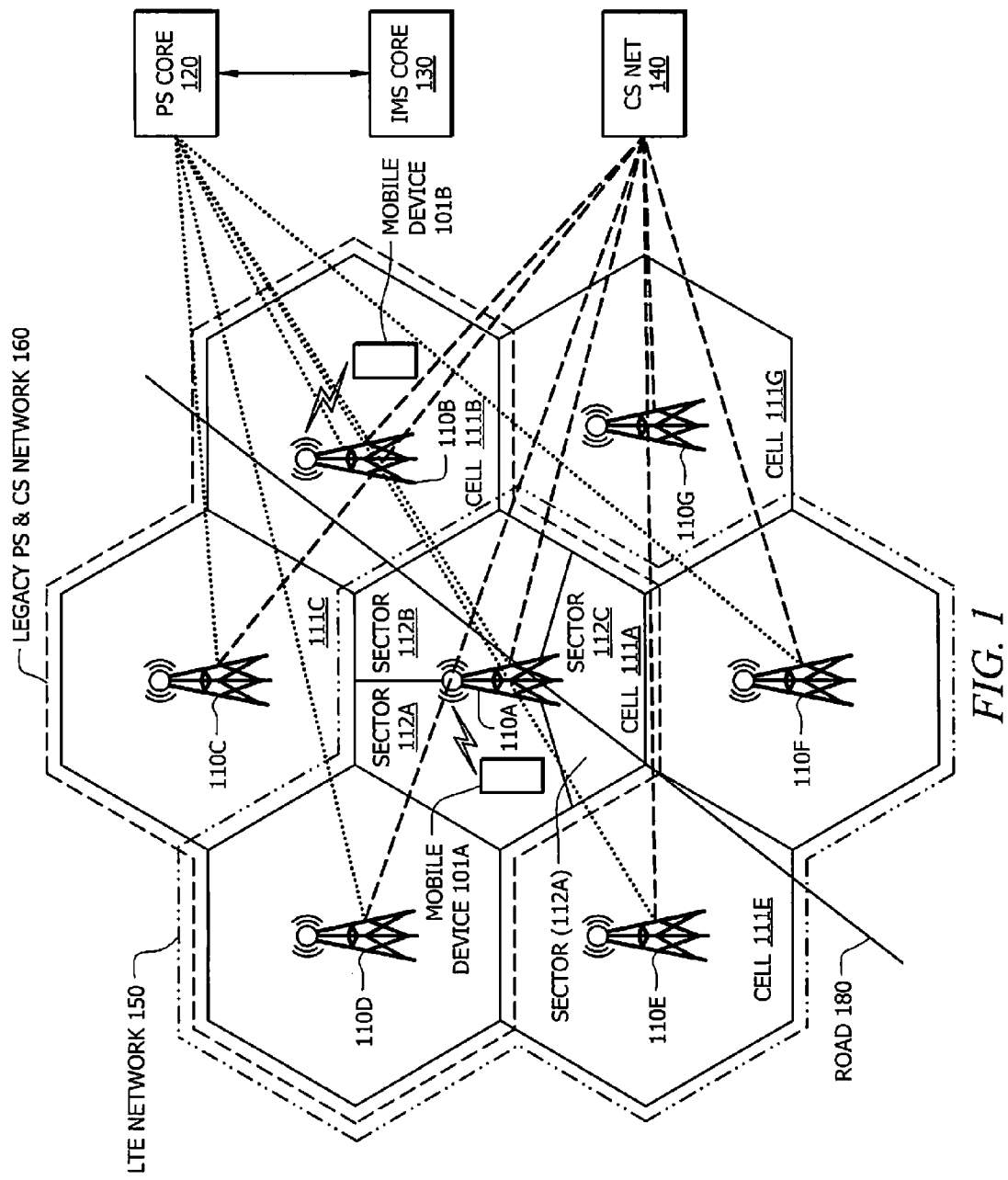
FIG. 1 illustrates a system adapted according to embodiments of the invention.

FIG. 1 shows communication system 100 adapted according to an embodiment of the invention. Communication system 100 of the illustrated embodiment includes at least a Packet Switched (PS) core 120, a Circuit Switched (CS) core 140, and an IP Multimedia Subsystem (IMS) core 130. PS core 120 may comprise various configurations of PS networks, including enhanced data networks such as LTE and 4G and legacy networks such as 3G, HSPA, and 1×, providing routing of data packets through the network using virtual circuits. CS core 140 may comprise circuit switched voice networks (e.g., circuit switched networks for 2G, 3G, HSPA and 1×). IMS core 130 may comprise a data network providing signaling to control, and access to, real-time multimedia, video, and voice services to mobile devices in PS core 120.

Base stations 110A, 110B, 110C, 110D, 110E, 110F, and 110G provide communication links with mobile devices (e.g. mobile devices 101A, and 101B), and may also be referred to as a node B, an access point, and the like. The base stations may be wirelessly coupled to mobile devices (e.g., base station 110A coupled to mobile device) and may provide mobile devices with access to one or more of PS core 120, IMS core 130, and CS core 140. As should be appreciated from FIG. 1, access can be provided to one or more of PS core 120, IMS core 130, and CS core 140 by the same base station. In accordance with the foregoing, base stations 110A, 110B, 110C, 110D, 110E, 110F, and 110G are shown communicatively connected to at least one of PS core 120 and CS core 140.

The base stations may provide coverage to access communication services (e.g., Media over Data, LTE data services, short message service (SMS), general packet radio service (GPRS), multimedia broadcast service, etc.) for a particular geographic area. The term "cell" can refer to this particular geographic coverage area of a base station and/or a base station subsystem serving the coverage area, depending on the context in which the term is used. For example, base station 110A may provide VoLTE coverage for cell 111A, and base station 110B may provide coverage for cell 111B. Each cell may be divided further into coverage "sectors." For example, cell 111A may be divided into three sectors 112A, 113A, and 114A. A segment, as used herein, may refer to a cell, a sector, a cluster of cells, a cluster of sectors, or any portion of the communication network, etc., within a communications system, such as communication system 100. For example, sector 112A may be a segment providing Media over Data coverage. In other embodiments, cell 111B may be a segment providing Media over Data coverage. In other embodiments still, both sector 112A and cell 111B may be segments providing Media over Data coverage.

The various base stations of communication system 100 (e.g., base stations 110A, 110B, 110C, 110D, 110E, 110F, and 110G) may be adapted to provide wireless communication services to mobile devices using PS and/or CS communication links. For example, base stations 110A, 110D, 110E, and 110F of the illustrated embodiment comprise part of LTE network 150 of PS core 120, and are adapted to provide communication services using both PS (e.g., using enhanced data functionality of LTE) and CS communication links. Base stations 110A, 110B, 110C, and 110D of the illustrated embodiment comprise part of legacy PS & CS network 160 of PS core 120, and are adapted to provide communication services using both PS (e.g., using legacy data functionality of 3G, HSPA, 1×, etc.) and CS communication links (e.g., 2G or 3G circuit switched voice). Base station 110G, however, comprises part of CS core 140 alone (i.e., does not comprise part of PS core 120), and thus is adapted to provide communication services using only CS communication links.

As can be appreciated from the foregoing, access to LTE network 150 and legacy PS & CS network 160 within PS core 120 may be provided by the same base station. For example, as shown in FIG. 1, base station 110A may provide mobile device 101A access to LTE network 150 and legacy PS & CS network 160. Of course, a base station may also provide access to only a subset of the networks. For example, base station 110B may provide mobile device 101B access to legacy PS & CS network 160 but no access to LTE network 150.

In the embodiment illustrated in FIG. 1, base stations of PS core 120 may also be communicatively connected to IMS core 130. For example, base stations 110A and 110B may be connected to IMS core 130. Additionally, base stations may provide mobile devices access to IMS core 130. Communication between a mobile device and IMS core 130 may employ any one of a number of protocols (e.g., Session Initiation Protocol [SIP].)

Communication system 100 is adapted to support Media over Data, such as VoLTE, and is operable to selectively disallow use of Media over Data, at call initiation, in a segment. Although the examples described herein use VoLTE as a specific example of a Media over Data service, it should be appreciated that the concepts described herein apply to other implementations of Media over Data that have been developed, or might be developed in the future (e.g., enhanced forms of VoIP, Voice over WiFi, etc.).

As will be appreciated from the description of embodiments below, selectively disallowing a Media over Data call in a segment, at call initiation, based on some segment characteristic that increases the risk to the Media over Data call in accordance with the concepts herein, may increase the overall quality of the call because the call may be forced to initiate using a different network (e.g., legacy network). The quality of the call may be increased because the legacy network may not be affected by the same characteristic that increases the risk to the Media over Data call. For example, a VoLTE call may be initiated by mobile device 101B within cell 111A associated with base station 110A in LTE network 150. Cell 111A may have some characteristic that increases the risk to the VoLTE call (e.g., low signal strength from base station 110A, excessive network delays, high data packet-error rates, low bandwidth, proximity to a cell (e.g., cell 111G associated with base station 110G) which does not support LTE services, etc.). Selectively disallowing the VoLTE call may force the call to initiate using a different network, such as CS core 140. Additionally, selectively disallowing the Media over Data call in cell 111A may force a call to initiate using a base station associated with a different cell which may be capable of serving the call in accordance with a consummate user experience. For example, the Media over Data call may be initiated by cell 111B, which may not be affected by the characteristic that made initiating the VoLTE call undesirable in cell 111A.

Although a mobile device may usually be served by the base station with the better coverage quality, the coverage provided by each base station (e.g., base stations 110A, 110B, 110C, 110D, 110E, 110F, or 110G) may not always be adequate to operate mobile devices (e.g. mobile device 101A or 101B) for access to Media over Data services, such as VoLTE. In some embodiments, the poor quality of Media over Data coverage may be the result of communication network conditions (e.g., low signal strength, excessive network delays, high data packet-error rates, low bandwidth, etc.). It should be appreciated then, that the quality of Media over Data calls may be different in different cells. Additionally, the quality of Media over Data coverage may vary within a cell (e.g., different quality of Media over Data coverage in sectors 112A, 113A, and 114A.). Accordingly, the quality of Media over Data coverage may vary from segment to segment, with the quality of some segments being sufficient to provide adequate Media over Data services, such as VoLTE, and the quality of Media over Data coverage in other segments being poor. In embodiments, when a Media over Data call originates from, or terminates at, a segment with poor Media over Data coverage, the Media over Data call may suffer from poor quality (e.g., poor voice and/or video quality, excessive delays, etc.,) or may be dropped. In this case, by selectively disallowing Media over Data services, at call initiation, in a segment with poor Media over Data coverage, the overall quality of a Media over Data call, such as a VoLTE call, may be increased because disallowing the Media over Data call may force the call to be made on the Legacy CS network which will provide a higher voice quality experience in that segment.

Additionally, a handover to another segment (e.g., cell or sector) which does not implement the same Radio Access Technology (RAT), and thus not supporting VoLTE, may be necessary (e.g., due to movement of the mobile device, due to a reduction in quality of the Media over Data coverage in a current segment, etc.) For example, movement of mobile device 101A utilizing VoLTE communications in sector 112A, or a reduction in the quality of the VoLTE communications provided by base station 110A, may force a VCC handover of mobile device 101A from the LTE network 150 to the CS core 140 (e.g., handover to cell 111C or handover from LTE network 150 to CS core 140 within cell 111A) to ensure call continuity. From the foregoing, it should be appreciated that the VCC may not require a handover to a different base station. For example, a VCC handover in cell 111A may involve handing over mobile device 101A from the LTE network 150 accessed via base station 110A, to CS core 140 accessed via same base station 110A. However, the VCC handover may involve handing over mobile device 101A to a different base station. For example, a VCC handover may involve handing over mobile device 101A from the LTE network 150 accessed via base station 110A, to 3G network 160 accessed via base station 110B. According to embodiments of the invention, selectively disallowing Media over Data services, at call initiation, in a segment with a high likelihood of a VCC handover during the call, may increase the overall quality and user experience because a marginal Media over Data call is avoided.

It should be appreciated that a VCC handover is expected when a mobile device (e.g., mobile device 101A) moves from a cell with LTE coverage to a cell without LTE coverage. However, VCC handovers are not expected when a mobile device does not move outside an area of LTE coverage. According to embodiments of the invention, selectively disallowing Media over Data services, at call initiation, in a segment with a high likelihood of a VCC handover during the call, may increase the overall quality and user experience because a marginal Media over Data call is avoided.

In some embodiments of the invention, a Media over Data call may be handed over to a legacy CS network based on a determination that a mobile device associated with the Media over Data call is about to enter a segment where Media over Data calling is disallowed. For example, mobile device 101A may initiate a VoLTE call within cell 111A. VoLTE calling may be disallowed within cell 111C. In embodiments, when it is determined that mobile device is about to enter cell 111C while the VoLTE call is in progress, a VCC handover to the legacy CS network may be initiated. The VCC handover may occur prior to mobile device 101A actually entering cell 111C, or after mobile device 101A has actually entered cell 111C.

It will be appreciated that, generally, a handover from one technology to another increases the risk of a dropped call and therefore may impact the quality of a user experience. However, it may be determined that a handover to a first technology (e.g., from VoLTE to a particular implementation of VoIP) may not unacceptably increase the risk of a dropped call during handover, but a handover to a second technology (e.g., from VoLTE to legacy CS call) may unacceptably increase such risk. In that case, selectively disallowing Media over Data call in a segment, at call initiation, may include allowing a Media over Data call in a segment with a high likelihood of a handover to the first technology, because a handover to the first technology does not increase the risk of a dropped call and thus, the user experience may not be affected. In some embodiments, selectively disallowing Media over Data call in a segment, at call initiation, may include disallowing a Media over Data call, at call initiation, in a segment with a high likelihood of a handover to the second technology because allowing the Media over Data call in this case may increase the risk of a dropped call impacting the user experience.

The quality of a Media over Data call, such as VoLTE, in a segment may be at risk due to the location of the segment within the area of coverage for Media over Data services. For example, a segment may be located at the edge of the coverage area. The risk may be in that a mobile device initiating a Media over Data call may move from an edge segment providing Media over Data coverage to an area without coverage. Moving to an area outside coverage may force a dropped call, or may force a handover to another technology to provide call continuity. For example, cell 110A is shown to be at the edge of LTE coverage. Mobile device 101A may initiate and establish a VoLTE call while in edge cell 111A. Mobile device 101A may subsequently move to cell 111C, outside LTE coverage, but within 3G network 160 coverage, thereby forcing a handover to CS core 140, since 3G network may not be adapted to provide VoLTE. In other embodiments, mobile device 101A may initiate and establish a Media over Data call while in edge cell 111A, and 3G network 160 may be adapted to provide Media over Data call continuity. Mobile device 101A may subsequently move to cell 111C, outside LTE coverage, but within 3G network 160 coverage, thereby forcing a handover to 3G network 160.

According to embodiments of the invention, selectively disallowing Media over Data services, at call initiation, in a segment may be based on segment characteristics, and the characteristics may include whether a segment is an edge segment (i.e., the characteristics of a nearby segment, such as a segment adjacent to a segment in which a call originates or terminates), and disallowing the Media over Data based on that characteristic. Additionally or alternatively, embodiments may determine whether the segment characteristic includes a higher likelihood of a handover to another technology, and whether the handover results in a higher likelihood of a dropped call. Where the handover is not likely to result in a dropped call, embodiments may allow a Media over Data with a high risk of a handover.

Figure 2:
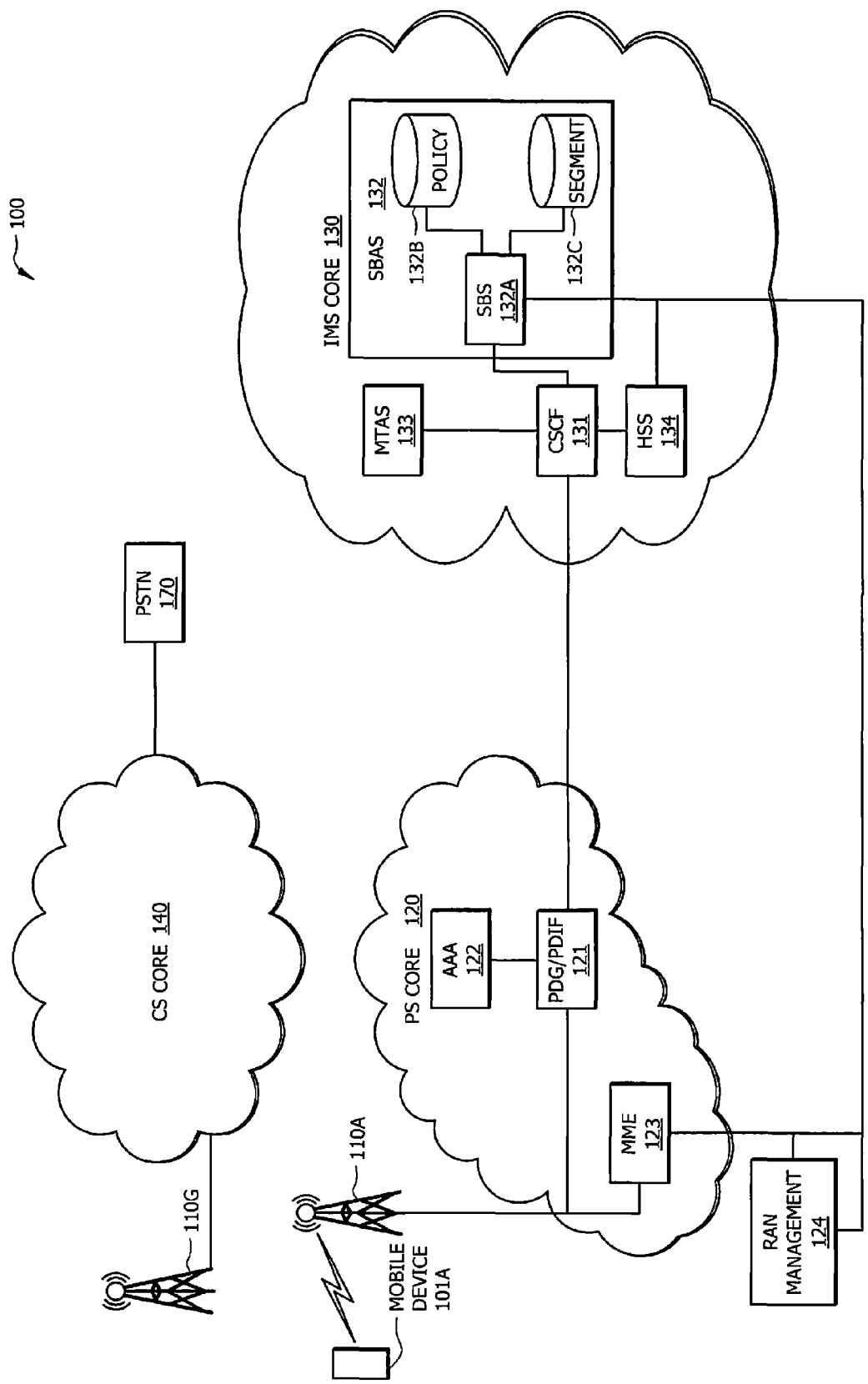
FIG. 2 illustrates additional detail with respect to a system adapted according to embodiments of the invention.

FIG. 2 shows additional detail with respect to communication system 100 adapted according to embodiments of the invention. As also shown in FIG. 1, FIG. 2 shows communication system 100 of the illustrated embodiment, including PS core 120, CS core 140, and IMS core 130. Mobile device 101A may be coupled to PS core 120 via base station 110A, and may also be coupled to CS core 140 via base station 110G, or via base station 110A. CS core 140 is adapted to provide traditional voice communication services (e.g., cellular telephony service) to various communication devices, such as mobile devices 101A. For example, CS core 140 may be adapted to provide CS services to mobile device 101A.

Although not shown in FIG. 2, CS core 140 may comprise additional or alternative systems, data, and interconnections. For example, embodiments of CS core 140 will typically comprise a large number of Mobile Switching Centers (MSCs), Visiting Location Registers (VLRs), and Home Location Registers (HLRs). The legacy PS & CS network, and the LTE network may consist of base stations connected (e.g., by landlines, microwave, etc.) to gateways, radio network controllers (RNCs), or base station controllers (BSCs).

CS core 140 of embodiments will typically be coupled to the public switched telephone network (PSTN) 170 so as to facilitate communications between mobile devices (e.g., mobile device 101A) and devices coupled to the PSTN 170, including mobile devices of other CS network also coupled to the PSTN 170.

PS core 120 of the illustrated embodiment comprises a broadband packet switched network providing information communication supporting digitized data exchange suitable for communication links between mobile devices, such as mobile device, and other devices, devices coupled to packet switched core 120, etc. Accordingly, PS core 120 comprises packet data gateway/packet data information function (PDG/PDIF) 121, authentication, authorization, and accounting (AAA) server 122, Mobility Management Entity (MME) 123, and Radio Access Network (RAN) management 124 operable to selectively disallow use of Media over Data in a segment, at call initiation, according to embodiments of the invention.

PDG/PDIF 121 provides a packet switched network data gateway facilitating data packet communication between devices, such as base station 110A, and other devices of PS core 120 or IMS core 130. For example, PDG/PDIF 121 may provide interfacing, link security, protocol conversion, data packet routing, and/or other functions for network edge devices, such as base station 110A. Although preferably including features and functions of otherwise conventional gateways, embodiments of PDG/PDIF 121 are adapted to selectively disallow use of Media over Data in a segment, at call initiation, as described herein.

AAA server 122 of embodiments provides centralized access, authentication, authorization and accounting management for devices to connect and use a network service of PS core 120. For example, AAA server 122 may implement internet protocol security (Ipsec) protocols for establishing mutual authentication, negotiation of cryptographic keys to be used during a communication session, etc. Although preferably including features and functions of otherwise conventional AAA servers, embodiments of AAA server 122 are adapted to selectively disallow use of Media over Data in a segment, at call initiation, as described herein.

MME 123 provides control signaling for PS core 120. MME 123 may initiate paging and authentication of mobile devices. MME 123 may also be involved in choosing the right gateway during the initial registration process. MME 123 may also be adapted to keep location information for subscribers associated with a Media over Data call. In embodiments, MME 123 may be communicatively coupled to RAN management 124, and may be adapted to monitor Media over Data calls and determine whether a mobile device associated with a Media over Data call is about to enter a segment where Media over Data services are disallowed. In that case, a handover to a legacy network may be initiated either before the mobile device enter the disallowed segment, or after the entering the disallowed segment. MME 123 may be communicatively coupled to SBS 132A and may use information from SBA 132 in order to determine if Media over Data is disallowed in a segment. Although preferably including features and functions of otherwise conventional MMEs, embodiments of MME 123 are adapted to selectively disallow use of Media over Data in a segment, at call initiation, as described herein.

RAN management 124 provides an interface to MME 123 for mobile devices to provide in-call reporting during media over Data calls. In embodiments, RAN management 124 may be adapted to monitor Media over Data calls and enable a determination to be made that a mobile device associated with a Media over Data call is about to enter a segment where Media over Data services are disallowed. In some embodiments, RAN management 124 makes the determination. In other embodiments, MME 123 makes the determination. RAN management 124 is communicatively coupled to SBA 132 and may use information from SBA 132 in order to determine if Media over Data is disallowed in a segment, or to enable MME 123 to make the determination.

IMS core 130 may support different access types (e.g., LTE, 3G, Wi-Fi, HSPA, etc.) and may support any of a number of protocols (e.g., SIP). In embodiments, SIP may be used to define messages to establish, manage, and terminate calls through the IMS core (e.g., Media over Data calls, VoLTE, video calls over PS, etc.). Accordingly, IMS core 130 of the illustrated embodiment comprises Call Session Control Function (CSCF) 131, Segment Blocking Application Server (SBAS) 132, Multimedia Telephony Application Server (MTAS) 133, and Home Subscriber Server 134 operable to selectively disallow use of Media over Data in a segment, at call initiation, according to embodiments of the invention.

CSCF 131 of embodiments provides centralized policy enforcement, authentication, registration, and control of IMS core sessions (e.g., Media over Data, video calls over PS, VoLTE, etc.). For example, CSCF 131 may be responsible for security of the SIP messages between mobile device 101A and IMS core 130, for allocating resources for the IMS session flow, for querying HSS 134 to obtain mobile device's 101 subscriber profile, for processing Media over Data calls, such as VoLTE, registration requests from mobile device 101A, for recording the location of mobile device 101A, and for Media over Data call processing (including e.g., routing of Media over Data calls to IMS applications, such as MTAS 133 and/or SBAS 132.). The operation of CSCF 131 may be controlled by policies (e.g., a mobile device's 101 subscriber specific policy stored in HSS 134.). Although preferably including features and functions of otherwise conventional CSCFs, CSCF 131 of the illustrated embodiment is adapted to selectively disallow use of Media over Data in a segment, at call initiation, as described herein.

HSS 134 of embodiments provides a centralized database that contains subscription-related information (e.g., mobile device's 101A subscriber profiles, preferences, mobile device capabilities, etc.), performs authentication and authorization of the user (e.g., via CSCF 131) and can provide information about the mobile device's 101 subscriber's location and IP information. HSS may provide support to any of the IMS core devices handling an IMS Media over Data call. For example, CSCF 131 may query HSS 133 to obtain mobile device's 101A subscriber profile, location, and IP information. Although preferably including features and functions of otherwise conventional HSS, HSS 134 of the illustrated embodiment is adapted for use in operation to selectively disallow use of Media over Data in a segment, at call initiation, as described herein.

MTAS 133 of embodiments provides voice and video services to IMS network clients. For example, MTAS 133 may support different access types (e.g., LTE, 3G, Wi-Fi, HSPA, etc.) from mobile device 101A to IMS core and may support different types of Media over Data services (e.g., Rich Media, Multimedia, Voice, Video, file sharing, other media communication, etc.). Additionally, MTAS 133 of embodiments may provide control with respect to various systems and devices to facilitate operation as described herein. For example, MTAS 133 of embodiments may provide control signals with respect to base station 110A, PDG/PDIF 121, etc. to control operational aspects thereof, to provide information thereto, to query information therefrom, and/or the like.

MTAS 133 of embodiments further operates to provide functionality of a base station controller (BSC) for base stations (e.g., base station 110A) coupled through packet switched core 120. Accordingly, MTAS 133 interacts with CS core 140, and other communication core networks (e.g., other IMS core networks, the PSTN, etc.), as a BSC to facilitate call setup and communications consistent with the communication protocols of such communications networks.

Additionally, MTAS 133 of embodiments may be adapted to facilitate handover of calls (e.g., Media over Data) to CS core 140. Embodiments herein may utilize VCC to provide handover of calls between PS core 120 and a CS core 140. In other embodiments, handover of calls occur between one system implementing one technology (e.g., Media over Data) and different system implementing a different technology. It should be appreciated that VCC handovers may occur in any number of situations. For example, the coverage areas provided by base stations (e.g., base station 110A) of PS core 120 may not provide adequate coverage of all areas in which users wish to operate mobile devices (e.g. mobile devices 101A) for Media over Data, such as VoLTE, communication services. Coverage gaps, coverage shadows, etc. may exist in various areas, such as within a building, on the far side of a mountain or other terrain, etc. Likewise, coverage may not be provided in certain areas, such as areas beyond the physical service limits of the service provider, etc. Furthermore, where coverage exists, the coverage may suffer from low quality (e.g., excessive network delays, high data packet-error rates, or low bandwidth.). Accordingly, a VCC handover of mobile device 101A may occur when mobile device 101A moves outside the area of coverage of base station 110A (e.g. cell 111A of FIG. 1). Alternatively or additionally, a VCC handover may occur when mobile device 101A stays within the area of coverage of base station 110A (e.g., cell 111A) but the coverage is of such low quality that it is insufficient to maintain a Media over Data, such as VoLTE, call. Although preferably including features and functions of otherwise conventional MTASs, MTAS 131 of the illustrated embodiment is adapted to provide operation to selectively disallow use of Media over Data in a segment, at call initiation, as described herein.

SBAS 132 of embodiments provides screening of Media over Data calls, such as VoLTE, and segments where Media over Data calls originate or terminate, and provides a centralized point to selectively disallow use of Media over Data in a segment, at call initiation. For example, SBAS 132 interacts with CSCF 131 to screen all VoLTE calls initiation requests, originating from, or terminating at, base station 110A, and may disallow a VoLTE call made in the coverage area of base station 110A. Additionally, SBAS 132 facilitates selectively disallowing use of Media over Data in a segment, at call initiation, using information and protocols consistent with native operation of CSCF 131 (e.g., Isc). That is, interaction between SBAS 132 and IMS core 130 of embodiments accommodates selectively disallowing use of Media over Data in a segment, at call initiation, without modification of IMS core 130 or its various devices. Accordingly, SBAS 132 comprises Segment Blocking Service (SBS) 132A, Policy Database 132B, and Segment Database 132C operable to selectively disallow use of Media over Data in a segment, at call initiation, according to embodiments of the invention.

SBS 132A may be communicatively connected to CSCF 131 and adapted to screen all Media over Data call initiation requests. For example, when a VoLTE call is initiated by mobile device 101A via base station 110A, a VoLTE call request message may be forwarded to SBS 132A via CSCF 131. In embodiments, SBS 132A may be adapted to selectively disallow use of Media over Data, at call initiation, in a segment associated with the VoLTE initiation request. For example, a VoLTE call in cell 111A of FIG. 1 may be disallowed, at initiation, by SBS 132A based on data obtained from Policy Database 132B relating to cell 111A. The data obtained from Policy Database 132B may contain information designating cell 111A as a segment where VoLTE calling is disallowed. In some embodiments cell 111A may be the segment from where the VoLTE call originates, where the VoLTE call terminates, or both.

In embodiments, a Media over Data call may be disallowed in a segment, at initiation, based on segment designations. For example, a VoLTE call originating from cell 111A of FIG. 1 and terminating at cell 111B may be disallowed, at initiation, by SBS 132A based on data obtained from Policy Database 132B relating to either cell 111A and 111B. The data obtained from Policy Database 132B may contain information designating both or either cells 111A and 111B as segments where VoLTE calling is disallowed (e.g., designated segments for disallowing VoLTE due to LTE signal quality is too poor to support VoLTE, chronic limited capacity availability, adjacent to one or more sector which does not support VoLTE, experience high levels of dropped calls when VCC is used to maintain voice calls, etc.).

In other embodiments, SBS 132A may collect or receive information relating to segment characteristics (e.g., network performance, packet-error rates, sufficiency of bandwidth to handle Media over Data calls, signal quality, signal strength, CQI, RSRP, RSRQ, average and/or peak latency, VCC handover count, location of the segment within the coverage area, etc.) and use the information relating to those characteristics to selectively disallow Media over Data calling in a segment. For example, VoLTE calling may be disallowed in cell 111A based on high packet error rates in cell 111A. In another example, a VoLTE originating from cell 111A and terminating in at cell 111B may be disallowed in originating cell 111A based on low Media over Data bandwidth in terminating cell 111B. The VoLTE call may additionally be disallowed at the terminating cell 111B based on low Media over Data bandwidth at the originating cell 111A. In another example still, a VoLTE call originating from cell 111A may be disallowed in cell 111A because cell 111A may be an edge segment. A person of ordinary skill in the art would appreciate that the segment characteristics mentioned in this example are not the only characteristics that can be considered when implementing embodiments of the invention, and include many others which are readily identified in accordance with the concepts herein. The segment characteristic data may be provided by Segment Database 132C, other devices within the IMS core 130 or PS core 120, or other devices and/or networks external to communication system 100.

SBS 132A may additionally or alternatively collect or receive information relating to subscriber profile characteristics (e.g., a location of the subscriber, an identity of the subscriber, last origination attempt, or the type of Media over Data call, etc.) of a subscriber profile associated with a Media over Data call, and may be adapted to selectively disallow Media over Data calling, at initiation, in a segment for the specific subscriber profile in the segment. For example, a VoLTE call in cell 111A from a mobile device 101A may be disallowed at initiation in cell 111A based on the identify of a subscriber profile associated with the VoLTE call. In some embodiments, the subscriber profile information may relate to the subscriber profile originating the Media over Data call, the subscriber profile terminating the Media over Data call (e.g., the destination subscriber profile), or both. SBS 132A may collect or receive the information relating to subscriber profile characteristics from Segment Database 132C, from other devices within the IMS core 130 or PS core 120, or from other devices and/or networks external to communication system 100.

Some embodiments may be adapted to selectively disallow Media over Data calling, at initiation, in a segment based on the movement, actual or predicted, of a mobile device associated with a Media over Data call. For example, referring to FIG. 1, a road 180 traversing LTE cells 111A and 111E, and 3G cell 111B, is shown. Embodiments may track the movement of mobile device 101A and may determine that mobile device 111A may be traveling along road 180, toward 3G cell 111B outside LTE coverage. This determination may be made on a prediction of the movement of the mobile device 101A. For example, road 180 may comprise a highway and it may be predicted that mobile device 101A, located on road 180, will eventually cross into cell 111B. Alternatively, it may be determined that mobile device 101A is actually moving through road 180 and will eventually cross into cell 111B. Mobile device 101A may originate a VoLTE call while still in cell 111A. According to embodiments of the present invention, the VoLTE call may be disallowed in cell 111A at initiation to prevent a VCC handover when the mobile device moves outside LTE cell 111A and into 3G cell 111B. In other embodiments, it may be determined that mobile device is travelling toward LTE cell 111E. Accordingly, a VoLTE call originated at cell 111A may not be disallowed at initiation since a VCC handover to CS core 140 will not be likely when the mobile device moves into cell 111E because cell 111E has LTE coverage.

Some embodiments may associate the identity of the subscriber initiating a Media over Data call within the segment from where the call originates. This association may then be used to determine the identity of the terminating segment of a subsequent Media over Data call made to that subscriber. For example, when a subscriber initiates a VoLTE call from mobile device 101A in cell 111A, data relating to the subscriber profile may be stored in Segment Database 132C. The subscriber profile information may include data relating to the identity of the segment from where the VoLTE call originated (e.g., cell 111A,) and an identity of the subscriber profile associated with mobile device 101A originating the VoLTE call. In some embodiments only the subscriber profile information relating to the last VoLTE call is stored in Segment Database 132C, and in other embodiments subscriber profile information relating to a plurality of VoLTE calls is stored. When a subsequent VoLTE call terminating at a mobile device associated with the subscriber profile is made, the subscriber profile information stored in Segment Database 132C may be used to determine the identity of the terminating segment of the VoLTE call. For example, when mobile device 101A originates a VoLTE call from cell 111A, cell 111A is associated as the last originating segment for mobile device 101A. When a subsequent VoLTE call is then made terminating at mobile device 101A, cell 111A is identified as the terminating segment. Alternatively, a terminating segment of a Media over Data call may be identified from a database in the network (e.g., HSS or HLR) containing the terminating subscriber's location. For example, the location of a subscriber associated with the terminating point of a VoLTE call may be obtained from a network database and may be used to identify the terminating segment of the VoLTE call. In the illustrated embodiment, SBS 132A is adapted to selectively disallow use of Media over Data in a segment, at call initiation, as described herein.

In some embodiments, the terminating segment of a Media over Data call may be identified from a database in the network containing the terminating subscriber's location. For example, HSS 134 may contain a subscriber profile information including subscriber location of subscriber associated with the terminating point of a Media over Data call. Additionally, the HLR (not shown) database may contain subscriber location information, and the subscriber location information may include subscriber location information of the subscriber associated with the terminating point of a Media over Data call. In other embodiments, subscriber location information may be obtained from MME 123.

Policy Database 132B provides information regarding a specific segment and a subscriber profile associated with a Media over Data call to SBAS 132A. In embodiments, Policy Database 132B may contain information designating segments and/or subscribers as either a segment and/or subscriber for which Media over Data calling is allowed or disallowed. Policy Database 132B may be fully configurable and may be manually generated. In other embodiments, Policy Database 132B may be generated dynamically and may be based on policy rules. For example, in embodiments, the rules may be related to characteristics of the segment. In some embodiments, segment characteristics may include subscriber profile characteristics. In other embodiments, segment characteristics may not include subscriber profile characteristics. In some embodiments, the Policy Database 132B is communicatively connected to SBS 132A, Segment Database 132C, or both.

Segment Database 132C provides information regarding a specific segment and a subscriber profile associated with a Media over Data call to SBAS 132A. Segment Database 132C may contain data to monitor segment characteristics (e.g., network performance, packet-error rates, sufficiency of bandwidth to handle Media over Data, VCC handover counts, or location of the segment within the coverage area) and to monitor subscriber profile characteristics (e.g., a location of the mobile device within the network, movement of the mobile device within the network, an identity of the subscriber, last origination attempt, or the type/activity of the Media over Data call, etc.). Database 132C may generate and/or update the Policy Database 132B based on observed segment and/or subscriber profile characteristics. For example, the identity of a subscriber in the subscriber profile information may determine whether a VoLTE call associated with the subscriber is allowed or disallowed. As another example, a high packet-error rate measured in cell 111A may result in designating cell 111A as a segment where VoLTE is disallowed.

Policy Database 132B may be fully configurable and may be dynamically generated based on segment characteristics and/or subscriber profile characteristics. As an example, a VoLTE call associated with a subscriber may be disallowed when the subscriber profile information indicates that the VoLTE call requires large bandwidth (e.g., during an interactive video call) and the segment characteristics information indicates that the segment is low on bandwidth. In other embodiments, Segment Database 132C may be manually generated and/or updated.

Having described the functional blocks of illustrative configurations of communication system 100 of FIG. 1 and FIG.

Figure 3:
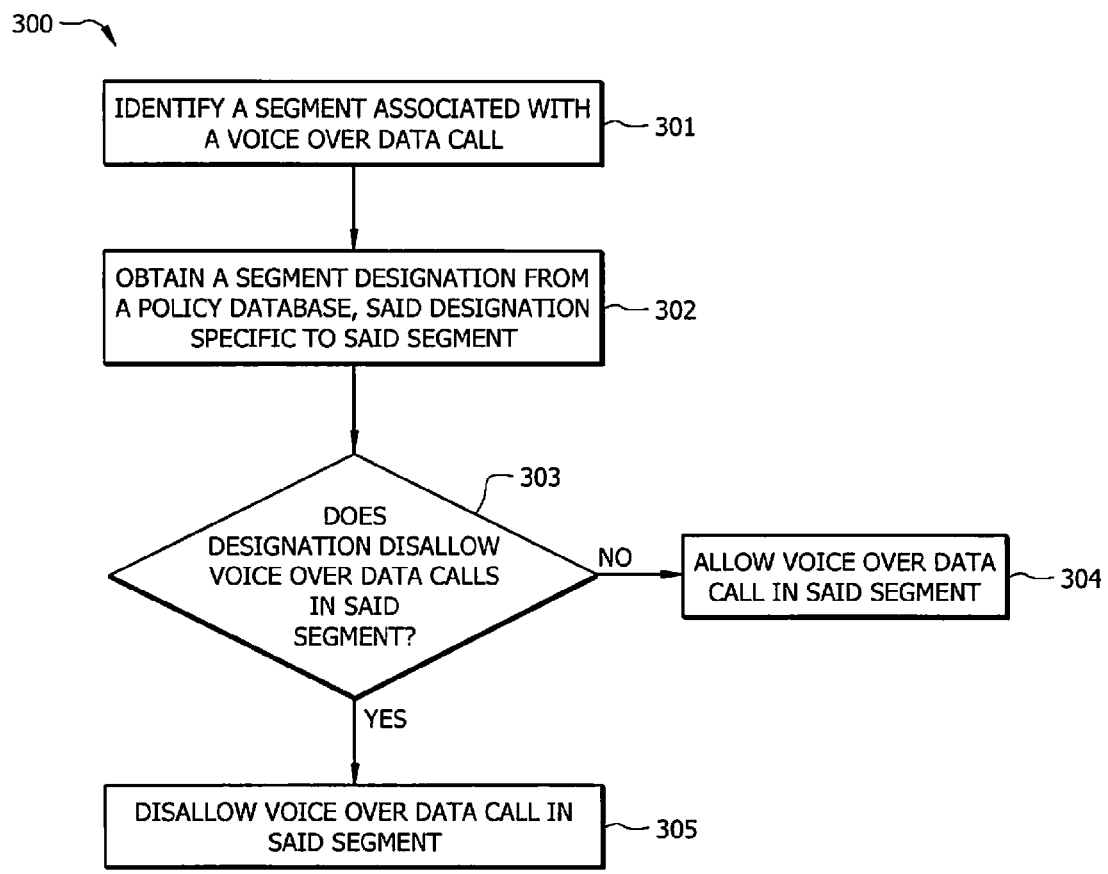
FIG. 3 illustrates a high level flow diagram of operation according to embodiments of the invention to selectively disallow use of Media over Data in a segment at call initiation.

2 adapted to selectively disallow use of Media over Data in a segment, at call initiation, attention is directed to FIG. 3 showing flow of operation of communication system 100 illustrating a method for selectively disallowing use of Media over Data in a segment, at call initiation, according to one embodiment of the disclosure. Method 300 may be useful for providing high-quality communication services by selectively disallowing Media over Data, at call initiation, in segments where some characteristic of the segment makes it likely that a Media over Data call will have low quality. Method 300 begins at block 301 with identifying a segment associated with a Media over Data call. The Media over Data call may be a VoLTE call. The segment may be a segment corresponding to an origination point of the Media over Data call or a termination point of the Media over Data call. In some embodiments, a plurality of segments may be identified at 301, such as to include a segment corresponding to an origination point of the Media over Data call and a segment corresponding to a termination point of the Media over Data call. Identification of a segment at 301 may be based on a header field in the Media over Data call origination request. Ideally, a request to initiate a Media over Data call may be done through the SIP protocol, which may include header fields containing a cell ID and/or a sector ID. In some embodiments, the segment may be a segment corresponding to the termination point of the Media over Data call, and identification may be done by obtaining a subscriber profile information including a last originating segment corresponding to a segment from where a last originating call attempt was made by the subscriber profile corresponding to the termination point of the Media over Data call.

At block 302, a segment designation is obtained from a policy database. The segment designation may indicate whether Media over Data is allowed or disallowed in the segment identified at block 301. The policy database may be fully configurable, and may be manually or dynamically generated from policy rules. The policy rules may be configured to monitor segment characteristics. According to one embodiment, the segment designation may be based on data in a segment database. The policy database and the segment database may be stand-alone databases or may be portions of a single database. In one embodiment, the data in the segment database may comprise information corresponding to characteristics of the segment identified at block 301. Segment characteristics may comprise network performance metrics, data packet-error rates, sufficiency of bandwidth to handle Media over Data, signal quality, signal strength, CQI, RSRP, RSRQ, average and/or peak latency, VCC handover count, the location of the segment with respect to coverage area, etc. Thus, a segment designation is made based on segment characteristics.

Still at block 302, segment characteristics may also, or alternatively, include subscriber profile information. According to one embodiment, the subscriber profile may correspond to the subscriber originating the Media over Data call. In other embodiments, the subscriber profile may correspond to the subscriber terminating the VoLTE call. In still other embodiments, the subscriber profile information may correspond to both the originating and terminating subscribers. Subscriber profile information may include an identify of a subscriber corresponding to the subscriber profile, a segment identity of a segment from where the last originating call attempt was made by the subscriber profile, a type of Media over Data call, the movement, actual or predicted, of the mobile device associated with the call, etc. The type of Media over Data call may include a VoLTE call, an interactive video call, an interactive audio call, or any other type of Media over Data call requiring large bandwidth.

At block 303, a determination is made about whether the designation obtained at block 302 disallows Media over Data in the segment identified at block 301. When it is determined that the designation obtained at block 302 disallows Media over Data in the segment identified at block 301, the operation at block 305 is performed. When it is determined that the designation obtained at block 302 allows Media over Data in the segment identified at block 301, the operation at block 304 is performed.

At block 304, an operation based on the segment designation obtained at block 302, and based on the determination made at block 303, is performed. The operation at block 304 consists of allowing Media over Data in the segment identified at block 301. In one embodiment, the operation is based on the originating segment designation obtained at block 302, and the operation consists of allowing Media over Data in the originating segment. According to another embodiment, the operation is based on the terminating segment designation obtained at block 302, and the operation consists of allowing Media over Data in the originating segment.

At block 305, an operation based on the segment designation obtained at block 302, and based on the determination made at block 303, is performed. The operation at block 304 consists of disallowing Media over Data in the segment identified at block 301. In one embodiment, the operation is based on the originating segment designation obtained at block 302, and the operation consists of disallowing Media over Data in the originating segment. According to another embodiment, the operation is based on the terminating segment designation obtained at block 302, and the operation consists of disallowing Media over Data in the originating segment.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Under general usage, disk and disc includes compact discs (CD), laser discs, optical discs, digital versatile discs (DVD), floppy disks, and blu-ray discs. Disks may reproduce data magnetically, and discs may reproduce data optically. Combinations of the above may also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for selectively disallowing use of Media over Data in a segment at call initiation, said method comprising:
    identifying a segment associated with a Media over Data call, wherein said identified segment is configured to provide Media over Data calling services;
    obtaining a segment designation from a policy database, wherein said segment designation is specific to said identified segment and indicates whether said Media over Data call in said identified segment is to be allowed or disallowed; and
    performing an operation based on said segment designation, wherein said operation includes one of disallowing and allowing said Media over Data call in said identified segment.

2. The method of claim 1 wherein said identified segment is a segment corresponding to an origination point of said Media over Data call.

3. The method of claim 1 wherein said identified segment is a segment corresponding to a termination point of said Media over Data call.

4. The method of claim 3 further comprising:
    obtaining subscriber profile information, said information including a last originating segment corresponding to a segment from where a last originating call attempt was made by said subscriber profile, said subscriber profile corresponding to said termination point of said Media over Data call,
    wherein said identifying a segment is based on said last originating segment.

5. The method of claim 3 further comprising:
    obtaining subscriber profile information, said information including a location of a subscriber associated with the subscriber profile information, said location obtained from a network database, and said subscriber corresponding to said termination point of said Media over Data call,
    wherein said identifying is based on said location.

6. The method of claim 1,
    wherein said identifying further includes:
        identifying a plurality of segments, said plurality of segments including an originating segment corresponding to a segment corresponding to an origination point of said Media over Data call, and a terminating segment corresponding to a segment corresponding to a termination point of said Media over Data call, and
    wherein said obtaining a segment designation further includes:
        obtaining a plurality of segment designations from a policy database, said plurality including a designation specific to said originating segment and a designation specific to said terminating segment.

7. The method of claim 6 wherein said performing an operation is based on said designation specific to said originating segment, and said operation includes one or more of: disallowing said Media over Data call in said originating segment and disallowing said Media over Data call in said terminating segment.

8. The method of claim 6 wherein said performing an operation is based on said designation specific to said terminating segment, and said operation includes one or more of: disallowing said Media over Data call in said originating segment and disallowing said Media over Data call in said terminating segment.

9. The method of claim 1 further comprising
    determining a likelihood that a handover from a first technology implementing said Media over Data call to a second technology capable of providing call continuity will have an adverse effect on said Media over Data call in said identified segment,
    wherein said segment designation is based, at least in part, on said likelihood.

10. The method of claim 1 further comprising
    tracking a movement of a mobile device associated with said Media over Data call in said identified segment; and
    determining whether said movement of said mobile device will result in said mobile device leaving said identified segment and entering a second segment,
    wherein said segment designation is based, at least in part, on whether said movement of said mobile device will result in said mobile device leaving said identified segment and entering a second segment and, at least in part, on second segment characteristics associated with said second segment.

11. The method of claim 1 wherein said segment designation is at least based on said identified segment comprising an area at an edge of a total coverage area, said total coverage area comprising an area covered by all segments adjacent to said identified segment.

12. The method of claim 1 wherein said segment designation is based on data in a segment database, said data in said segment database consisting of information corresponding to segment characteristics of said identified segment.

13. An apparatus for selectively disallowing use of Media over Data in a segment at call initiation, said apparatus comprising:
    at least one processor configured to:
        identify a segment associated with a Media over Data call, wherein said identified segment is configured to provide Media over Data calling services;
        obtain a segment designation from a policy database, wherein said segment designation is specific to said identified segment and indicates whether said Media over Data call in said identified segment is to be allowed or disallowed; and
        perform an operation based on said segment designation, wherein said operation includes one of disallowing and allowing said Media over Data call in said identified segment; and
    a memory coupled to the at least one processor.

14. The apparatus of claim 13 wherein said identified segment is a segment corresponding to an origination point of said Media over Data call.

15. The apparatus of claim 13 wherein said identified segment is a segment corresponding to a termination point of said Media over Data call.

16. The apparatus of claim 14 wherein said at least one processor is configured to identify said segment based on an identity header field in a Media over Data call origination request.

17. The apparatus of claim 15 wherein said at least one processor is configured to:
  obtain a subscriber profile information, said information including a last originating segment corresponding to a segment from where a last originating call attempt was made by said subscriber profile, said subscriber profile corresponding to said termination point of said Media over Data call,
  wherein said at least one processor configured to identify said segment is configured to identify said segment based on said last originating segment.

18. The apparatus of claim 13,
  wherein the at least one processor configured to identify said segment is configured to:
    identify a plurality of segments, said plurality of segments including an originating segment corresponding to a segment corresponding to an origination point of said Media over Data call, and a terminating segment corresponding to a segment corresponding to a termination point of said Media over Data call; and
    wherein said at least one processor configured to obtain a segment designation is configured to:
    obtain a plurality of segment designations from a policy database, said plurality including a designation specific to said originating segment and a designation specific to said terminating segment.

19. The apparatus of claim 18 wherein said at least one processor configured to perform said operation is configured to perform said operation based on said designation specific to said originating segment, and said operation includes one or more of: disallowing said Media over Data call in said originating segment and disallowing said Media over Data call in said terminating segment.

20. The apparatus of claim 18 wherein said at least one processor configured to perform said operation is configured to perform said operation based on said designation specific to said terminating segment, and said operation includes one or more of: disallowing said Media over Data call in said originating segment and disallowing said Media over Data call in said terminating segment.

21. The apparatus of claim 13 said at least one processor is configured to:
  determine a likelihood that a handover from a first technology implementing said Media over Data call to a second technology capable of providing call continuity will have an adverse effect on said Media over Data call in said identified segment,
  wherein said segment designation is based, at least in part, on said likelihood.

22. The apparatus of claim 13 said at least one processor is configured to:
  track a movement of a mobile device associated with said Media over Data call in said identified segment; and
  determine whether said movement of said mobile device will result in said mobile device leaving said identified segment and entering a second segment,
  wherein said segment designation is based, at least in part, on whether said movement of said mobile device will result in said mobile device leaving said identified segment and entering a second segment and, at least in part, on second segment characteristics associated with said second segment.

23. The apparatus of claim 13 wherein said segment designation is based on data in a segment database, said data in said segment database consisting of information corresponding to segment characteristics of said identified segment.

24. The apparatus of claim 23 wherein said segment characteristics include one or more of: a Media over Data packet-error rate, said segment's bandwidth, said segment's signal quality, said segment's signal strength, a Channel Quality Indicator (CQI), an Aggregate and/or Cell Edge Throughput indicator, an Average and/or Cell Edge Reference Signal Received Power (RSRP) value, a Reference Signal Received Quality (RSRQ) value, an average and/or peak latency of said segment's signal, and a voice call continuity handover count.

25. The apparatus of claim 23 wherein said segment characteristics include a subscriber profile information, said subscriber profile corresponding to one or more of: a subscriber initiating said Media over Data call and a subscriber receiving said Media over Data call.

26. The apparatus of claim 23 wherein said policy database and said segment database are portions of a single database.

27. A computer program product for selectively disallowing use of Media over Data in a segment at call initiation, comprising:
  a non-transitory computer-readable medium having program code recorded thereon, the program code including:
    code to identify a segment associated with a Media over Data call, wherein said identified segment is configured to provide Media over Data calling services
    code to obtain a segment designation from a policy database, wherein said segment designation is specific to said identified segment and indicates whether said Media over Data call in said identified segment is to be allowed or disallowed; and
    code to perform an operation based on said segment designation, wherein said operation includes one of disallowing and allowing said Media over Data call in said identified segment.

28. The computer program product of claim 27 wherein said Media over Data call comprises one of: a Voice over Data call, a Video over Data call, and a File Sharing over Data call.

29. The computer program product of claim 28 wherein said Voice over Data call comprises a Voice over LTE (VoLTE) call.

30. The computer program product of claim 27 wherein said identified segment is a segment corresponding to an origination point of said Media over Data call.

31. The computer program product of claim 27 wherein said identified segment is a segment corresponding to a termination point of said Media over Data call.

32. The computer program product of claim 31 wherein said identifying is based on an identity header field in a Media over Data call origination request.

33. The computer program product of claim 31 further comprising:
  code to obtain a subscriber profile information, said information including a last originating segment corresponding to a segment from where a last originating call attempt was made by said subscriber profile, said subscriber profile corresponding to said termination point of said Media over Data call,
  wherein the code to identify a segment is based on said last originating segment.

34. The computer program product of claim 31 further comprising:
  code to obtain a subscriber profile information, said information including a location of a subscriber associated with the subscriber profile information, said subscriber corresponding to said termination point of said Media over Data call, wherein the code to identify a segment is based on said location.

35. The computer program product of claim 27,
wherein the code to identify a segment further includes:
code to identify a plurality of segments, said plurality of segments including an originating segment corresponding to a segment corresponding to an origination point of said Media over Data call, and a terminating segment corresponding to a segment corresponding to a termination point of said Media over Data call, and
wherein the code to obtain a segment designation further includes:
code to obtain a plurality of segment designations from a policy database, said plurality including a designation specific to said originating segment and a designation specific to said terminating segment.

36. The computer program product of claim 35 wherein the code to perform an operation is based on said designation specific to said originating segment, and said operation includes one or more of disallowing said Media over Data call in said originating segment and disallowing said Media over Data call in said terminating segment.

37. The computer program product of claim 35 wherein the code to perform an operation is based on said designation specific to said terminating segment, and said operation includes one or more of: disallowing said Media over Data call in said originating segment and disallowing said Media over Data call in said terminating segment.

38. The computer program product of claim 27 further comprising:
code to determine a likelihood that a handover from a first technology implementing said Media over Data call to a second technology capable of providing call continuity will have an adverse effect on said Media over Data call in said identified segment,
wherein said segment designation is based, at least in part, on said likelihood.

39. The computer program product of claim 27 further comprising:
code to track a movement of a mobile device associated with said Media over Data call in said identified segment; and
code to determine whether said movement of said mobile device will result in said mobile device leaving said identified segment and entering a second segment,
wherein said segment designation is based, at least in part, on whether said movement of said mobile device will result in said mobile device leaving said identified segment and entering a second segment and, at least in part, on second segment characteristics associated with said second segment.

40. The computer program product of claim 27 wherein said segment designation is at least based on said segment comprising an area at an edge of a total coverage area, said total coverage area comprising an area covered by all segments adjacent to said identified segment.

41. The computer program product of claim 27 wherein said segment designation is based on data in a segment database, said data in said segment database including information corresponding to segment characteristics of said identified segment.

42. The computer program product of claim 41 wherein said segment characteristics include one or more of: a Media over Data packet-error rate, said segment's bandwidth, said segment's signal quality, said segment's signal strength, a Channel Quality Indicator (CQI), an Aggregate and/or Cell Edge Throughput indicator, an Average and/or Cell Edge Reference Signal Received Power (RSRP) value, a Reference Signal Received Quality (RSRQ) value, an average and/or peak latency of said segment's signal, and a voice call continuity handover count.

43. The computer program product of claim 41 wherein said segment characteristics include a subscriber profile information, said subscriber profile corresponding to one or more of: a subscriber initiating said Media over Data call and a subscriber receiving said Media over Data call.

44. The computer program product of claim 43 wherein said subscriber profile information includes one or more of: an identify of a subscriber corresponding to said subscriber profile, a segment identity corresponding to a segment from where a last originating call attempt was made by a subscriber corresponding to said subscriber profile, and a segment identity corresponding to a segment from where a last originating call attempt was made by a subscriber corresponding to said subscriber profile.

45. The computer program product of claim 43 wherein said subscriber profile information includes a type associated with said Media over Data call, said type comprising a type of a call requiring large bandwidth.

46. The computer program product of claim 27 wherein said policy database is one of manually updated or dynamically updated.

47. The computer program product of claim 41 wherein said segment database is one of manually updated or dynamically updated.

48. The computer program product of claim 27 wherein the computer program product comprises an IP Multimedia Subsystem (IMS) compliant server.

* * * * *

UNITED STATES PATENT AND TRADEMARK OFFICE
CERTIFICATE OF CORRECTION

| | | |
|---|---|---|
| PATENT NO. | : 9,408,067 B1 | |
| APPLICATION NO. | : 14/094518 | |
| DATED | : August 2, 2016 | |
| INVENTOR(S) | : John Hoadley et al. | |

It is certified that error appears in the above-identified patent and that said Letters Patent is hereby corrected as shown below:

In the Specification:

At column 8, line number 29, delete "110A" and replace with --111A--.

In the Claims:

At column 21, claim 36, line number 22, delete "of" and replace with --of:--.

Signed and Sealed this
Sixth Day of September, 2016

Michelle K. Lee
*Director of the United States Patent and Trademark Office*